Jan. 15, 1924.  
C. B. WARDMAN  
1,481,043  
BODY FOR USE ON MOTOR VEHICLES  
Filed Jan. 10, 1923  
3 Sheets-Sheet 3
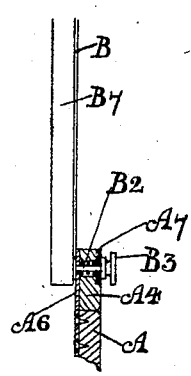
Fig. 3.
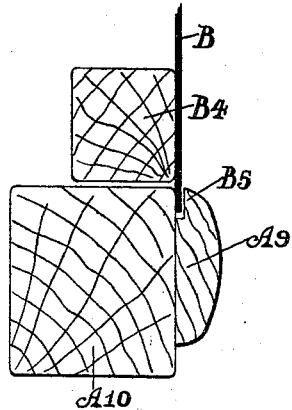
Fig. 4.
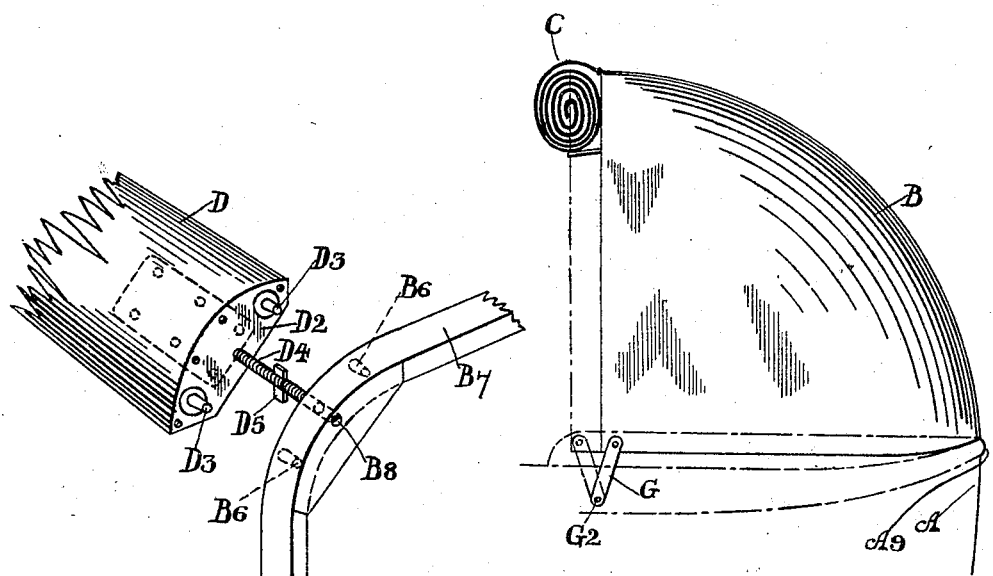
Fig. 5.
Fig. 6.
INVENTOR  
CHARLES B. WARDMAN  
PER  
Spear, Middleton, Donaldson & Hall  
ATTORNEY Patented Jan. 15, 1924.

1,481,043

UNITED STATES PATENT OFFICE.

CHARLES BENSON WARDMAN, OF SOUTHPORT, ENGLAND.

BODY FOR USE ON MOTOR VEHICLES.

Application filed January 10, 1923. Serial No. 611,734.

*To all whom it may concern:*

Be it known that I, CHARLES BENSON WARDMAN, a subject of the King of England, residing at Southport, in the county of Lancaster, England, have invented certain new and useful Improvements in Bodies for Use on Motor Vehicles, of which the following is a specification.

This invention relates to bodies for use on motor vehicles, and it has for its object to provide an improved "all-weather" body, i. e., a body which can be completely open or fully closed at will. The invention mainly applies to long bodies having two or more rows of seats, though it may be applied to short two-seated bodies. Its chief advantages over existing constructions are that the rear quarter is not collapsible and therefore presents a better appearance when up, all parts are concealed when the body is open, and all parts are carried on the vehicle, so that a change from closed to open can be effected on the road in a few minutes.

According to this invention, the top of the body comprises a rear quarter (which is not collapsible) pivoted to the sides of the vehicle and adapted to turn out of sight into a recess in the back of the body, canopy rails (preferably in sections) detachably secured to the rear quarter and extending forward to the windscreen pillars, a roll-up canopy carried by the rear quarter and adapted to be secured to the canopy rails, and windows fitting between the rails and the sides of the body.

Where the body is of such a length as to require it, there may be one or more intermediate supports for the canopy, comprising a transverse hood stick and telescopic supports therefor carried by the sides of the body.

It is not novel in itself to employ a rear quarter which is not collapsible and is pivoted to the sides of the body and adapted to turn about the pivots so that the quarter can drop into a recess in the back of the body, as this has previously been suggested for use on two-seated bodies. Preferably in the present invention the pivotal attachment is a movable one which permits the rear quarter, when turned upwards out of the recess, to be drawn bodily backwards slightly in order to rest upon the rear edge of the recess constituted by the body rail. Thus a watertight joint can be obtained which has not hitherto been effected in this manner with this type of disappearing quarter.

Figure 1:
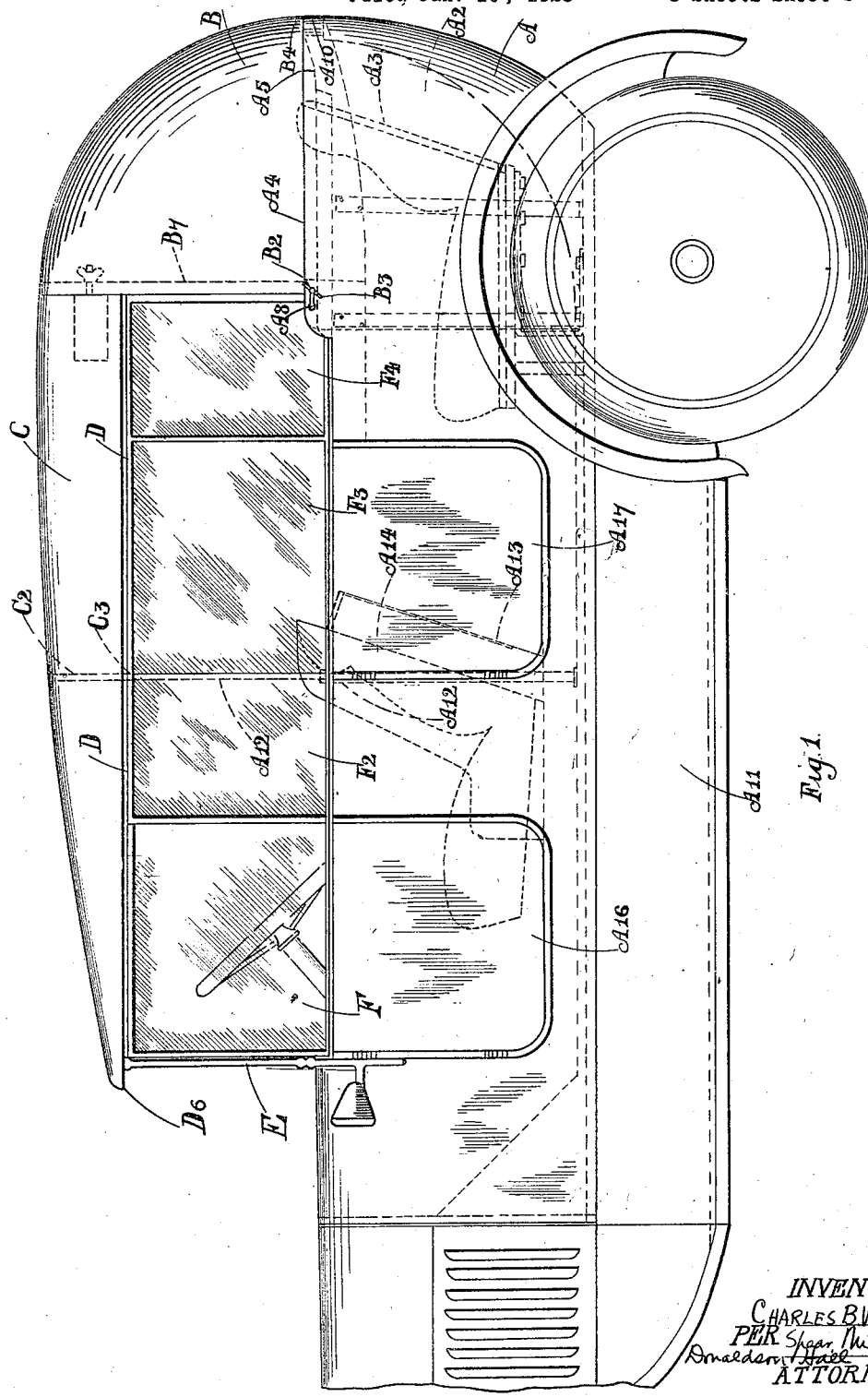
Figure 2:
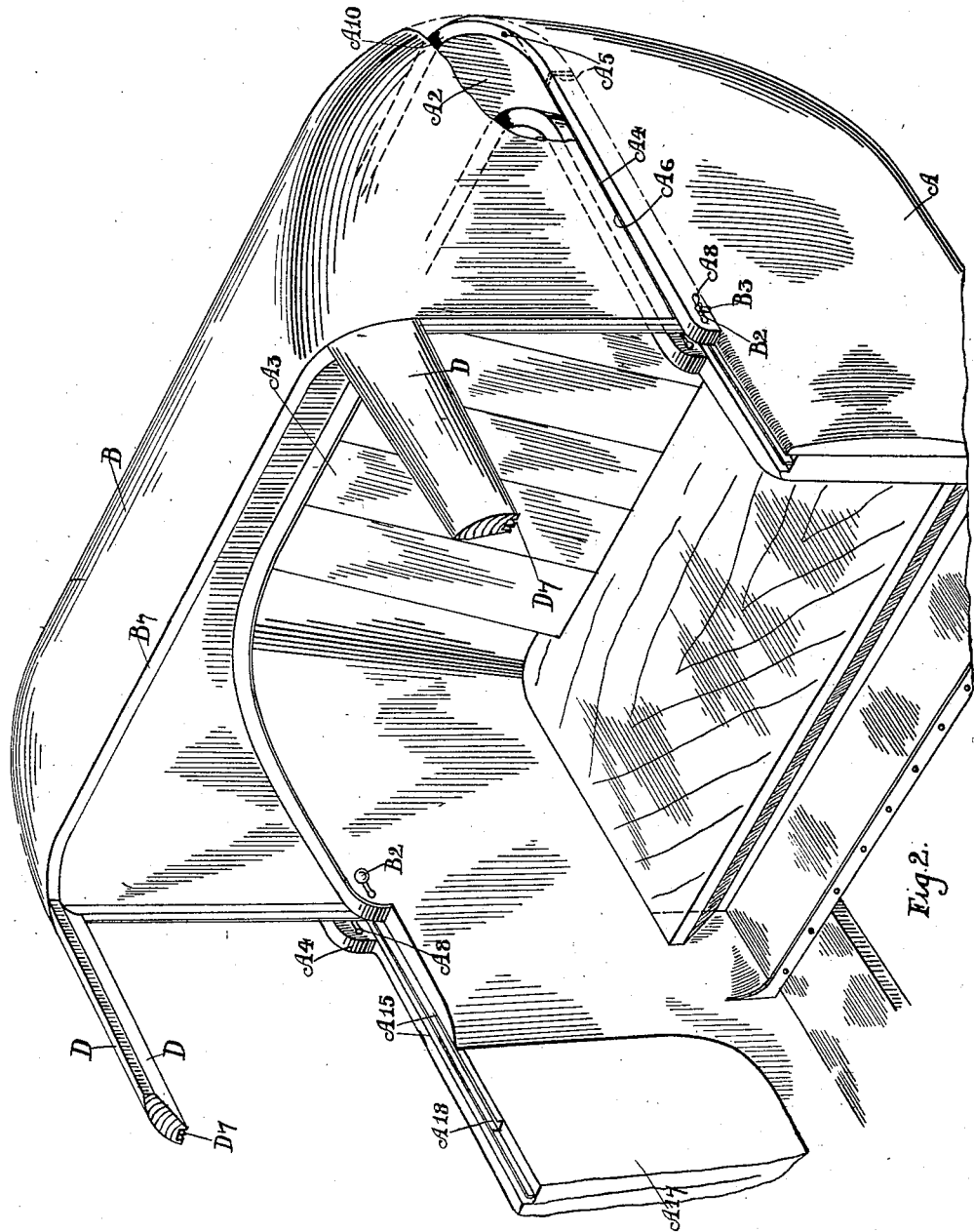

The manner of carrying out the invention is illustrated in the accompanying drawings, in which, Figure 1 is a side elevation showing the body as completely closed in, Figure 2 is a perspective view of the rear part of the body as seen from inside it, the roll-up canopy being removed and other parts being broken for clearness, Figure 3 is a fragmentary sectional view at the pivotal connection of the rear quarter, Figure 4 shows a fragmentary cross section through the rear joint of the rear quarter with the body, Figure 5 is a perspective view of the joint of the canopy rails with the rear quarter, and Figure 6 is a fragmentary side view showing an alternative form of pivotal attachment for the rear quarter.

The body of the vehicle is indicated at A, the rigid rear canopy at B, and the roll-up canopy at C.

A substantial space $A^2$ constituting the recess for the non-collapsible canopy B is left behind and beside the rear seats $A^3$, and between them and the rear panels of the body. At the sides the upper edges of the recess terminate in a pair of walls $A^4$, preferably constituted by wooden or metal side pieces, which are firmly secured at their rear edges to the sides of the recess. A swivel or hinge $A^5$ is fitted towards the rear edge and the front edges are not rigidly secured thereto so that these side pieces can be deformed slightly in order to grip the sides and the rear quarter. This, with the aid of rubber packing strips $A^6$, effects a watertight joint, when the rear quarter is raised. A small spring $A^7$ at the front edge of the side piece $A^4$ (see Figure 3) is arranged so as to press the side piece away from the rear quarter during the operation of raising or lowering the rear quarter, thereby preventing same being scratched.

The rear quarter B is of suitable shape in side elevation, preferably approximating to a segment of a circle, and at or near the point constituted by the centre of that circle at each side is mounted a laterally projecting stud or screwed pin $B^2$ which passes through slots $A^8$ in the side pieces $A^4$. Each stud carries a wing nut $B^3$, and the slots are arrranged approximately horizontally, the studs constituting the pivots about which the rear quarter is pivoted.

Normally the rear quarter lies out of sight in the recess $A^2$. When the wing nuts $B^3$ have been slackened the rear quarter can be turned about the screwed pins $B^2$ so that the edge which was horizontal becomes vertical, then drawing the rear quarter backwards slightly, the frame $B^4$ forming its lower edge fits over the rear body rail $A^{10}$ and can rest thereupon, being located by dowels or the like and the joint made weatherproof by a tongue $B^5$ on the rear quarter entering a groove formed between the moulding $A^9$ and the part of the rail $A^{10}$ along the back of the body. The wing nuts are then tightened up and the rear quarter is substantially held, and as the side pieces $A^4$ grip the lower edges of the rear quarter a weathertight joint is obtained there also, and may be assisted by the use of suitable packing strips where necessary.

The rear quarter may have lights in the sides and back, and may be metal panelled, or of leather with suitable supporting strips, or may be of metal panels covered with leather.

To the front edge of the rear quarter there is attached at each side a forwardly projecting rail D constituting the canopy rail. The rear end $D^2$ of each rail is preferably formed with a pair of dovetails $D^3$ adapted to engage sockets $B^6$ in the frame $B^7$ forming the front edge of the rear quarter, and the rail also carries a rearwardly projecting stud $D^4$ which passes through a hole $B^8$ in the front frame of the rear quarter and receives a wing nut or the like which may be locked by a locking tongue $D^5$ pivoted to the stud. These rails may be in two or more sections suitably joined or hinged together, and they extend forward to the windscreen E where they may be connected together by a transverse front rail $D^6$. At the front ends the rails may be secured to screwed stems projecting up from each windscreen pillar and receiving wing nuts locked by pivoted locking tongues in a manner corresponding to their attachment to the rear quarter.

When not in use these canopy rails D may be stowed away in any convenient part of the vehicle, as, for example, in compartments located at each side of the frame and behind the step valance $A^{11}$, which is hinged to permit access to the compartment.

The front edge of the rear quarter has attached to it the canopy C which is normally rolled up and kept so by a strap. After the rails D have been put in position the canopy is unrolled forwardly and secured, as by turn buttons or the like, to the canopy rails. If required, there may be fitted a transverse tubular hook stick or bow $C^2$, the ends $C^3$ of which engage supports carried by the body which are preferably constituted by telescopic sticks $A^{12}$ which collapse and are out of sight when not required.

Between the top of the body and the rails D are windows F, $F^2$, $F^3$, $F^4$, which may slide vertically in the bodywork in the well known manner, or they may be completely detachable, being normally stowed in a case $A^{13}$ behind the front seats $A^{14}$. These windows may be fitted into felt lined channels $A^{15}$ and $D^7$ in the body rails and canopy rails respectively, and one or more of the windows may slide sideways in the well known manner.

It is preferred that the windows F and $F^3$ over the doors $A^{16}$, $A^{17}$, should slide alongside the fixed windows $F^2$, $F^4$, arranged to the rear of these. To prevent damage to the windows should a door be opened when the window is partly open, the inside wall of the door channel may be omitted for part of its length, as shown at $A^{18}$, Figure 2.

As an alternative to allowing the studs $B^2$ which constitute the pivots for the rear quarter B to slide in slots as at $A^8$, these studs may be carried by pivoted links G, (Figure 6), attached to the body at $G^2$, the travel of which links is limited according to requirements.

By this means all the parts can be carried on the vehicle and the complete top with windows can be fitted or removed in a few minutes, and all parts are out of sight when the body is completely open.

What I claim as my invention and desire to secure by Letters Patent of the United States is:—

1. In a body for a motor vehicle, the combination of a non-collapsible rear quarter pivoted to the sides of said body and adapted to be swung into a recess in the back thereof, windscreen pillars at the front of said body, canopy rails formed in sections collapsibly connected together and extending forwardly to said windscreen pillars, a transverse rail uniting the forward parts of said canopy rails, a roll-up canopy also carried by said rear quarter, a detachably mounted bow supporting said canopy when extended, telescopically jointed bow sticks carried by said body to support said bow, and windows fitting between said canopy rails and the sides of said body, substantially as set forth.

2. In a body for a motor vehicle, the combination of a non-collapsible rear quarter pivoted to the sides of said body and adapted to be swung into a recess in the back thereof, windscreen pillars at the front of said body, canopy rails carried by said rear quarter and extending to said windscreen pillars, a roll-up canopy also carried by said rear quarter, doors provided in the sides of said body, rails along the edges of said body and said doors, grooves formed in said canopy rails and in said body and door rails, windows engaging said grooves and adapted to slide horizontally therein, and a gap in the wall of said grooves in said door rails, to permit of opening said door if a partially withdrawn window extends across its junction with the body, substantially as set forth.

In testimony whereof I have signed my name to this specification in the presence of two subscribing witnesses.

CHARLES BENSON WARDMAN.

Witnesses:
WILLIAM PIERCE,
JAS. C. McRAE.